US011634571B2

United States Patent
Gahleitner et al.

(10) Patent No.: US 11,634,571 B2
(45) Date of Patent: Apr. 25, 2023

(54) SOFT AND TRANSPARENT PROPYLENE COMPOLYMERS

(71) Applicant: BOREALIS AG, Vienna (AT)

(72) Inventors: Markus Gahleitner, Neuhofen/Krems (AT); Jingbo Wang, Engerwitzdorf (AT); Carl-Gustaf Ek, Västra Frölunda (SE); Klaus Bernreitner, Linz (AT)

(73) Assignee: Borealis AG, Vienna (AT)

( * ) Notice: Subject to any disclaimer, the term of this patent is extended or adjusted under 35 U.S.C. 154(b) by 95 days.

(21) Appl. No.: 17/235,083

(22) Filed: Apr. 20, 2021

(65) Prior Publication Data

US 2021/0309844 A1 Oct. 7, 2021

Related U.S. Application Data

(63) Continuation of application No. 16/095,212, filed as application No. PCT/EP2017/061659 on May 16, 2017, now Pat. No. 11,015,048.

(30) Foreign Application Priority Data

May 18, 2016 (EP) .................................... 16170177

(51) Int. Cl.
*C08L 23/16* (2006.01)
*C08L 23/14* (2006.01)
(Continued)

(52) U.S. Cl.
CPC .............. *C08L 23/16* (2013.01); *C08F 2/001* (2013.01); *C08F 210/06* (2013.01); *C08F 210/16* (2013.01); *C08L 23/142* (2013.01); *C08F 2500/12* (2013.01); *C08F 2500/26* (2013.01); *C08L 2203/16* (2013.01); *C08L 2205/025* (2013.01); *C08L 2205/03* (2013.01);
(Continued)

(58) Field of Classification Search
None
See application file for complete search history.

(56) References Cited

U.S. PATENT DOCUMENTS 6,770,714 B2 * 8/2004 Ommundsen ........... C08L 23/10
525/240
6,930,149 B2 * 8/2005 Haerkoenen .......... C08L 23/142
525/240

(Continued)

FOREIGN PATENT DOCUMENTS

CN 104995215 A 10/2015
EP 0887379 12/1998

(Continued)

OTHER PUBLICATIONS

Plastics—Determination of Dynamic Mechanical Properties Part 7: Torsional Vibration—Non-resonance method, International Standard ISO_6721-7, Second Edition, Apr. 2019, 16 pages.

(Continued)

*Primary Examiner* — Vu A Nguyen
(74) *Attorney, Agent, or Firm* — Lowenstein Sandler LLP (57) ABSTRACT

The present invention is directed to a polypropylene composition (C) comprising a heterophasic propylene copolymer (RAHECO) and a plastomer (PL) as well as a process for the preparation of said polypropylene composition and a film obtained from said polypropylene composition (C).

16 Claims, 1 Drawing Sheet

Flexural modulus and film haze of the inventive and comparative examples (51) Int. Cl.
  *C08F 2/00*      (2006.01)
  *C08F 210/06*    (2006.01)
  *C08F 210/16*    (2006.01)

(52) U.S. Cl.
  CPC ....... *C08L 2207/02* (2013.01); *C08L 2308/00* (2013.01); *C08L 2314/02* (2013.01)

(56) References Cited

U.S. PATENT DOCUMENTS

| | | | | |
|---|---|---|---|---|
| 9,181,423 | B2* | 11/2015 | Kock | C08L 23/06 |
| 9,290,649 | B2* | 3/2016 | Tranninger | C08F 2/001 |
| 2010/0093939 | A1 | 4/2010 | Gahleitner | |

FOREIGN PATENT DOCUMENTS

| | | | | |
|---|---|---|---|---|
| EP | 1211289 | | 6/2002 | |
| EP | 1211289 | A1 * | 6/2002 | ............ C08F 10/06 |
| EP | 1211289 | A1 | 6/2002 | |
| EP | 2471858 | | 7/2012 | |
| EP | 2471858 | A1 * | 7/2012 | ............ C08L 23/04 |
| EP | 2415790 | | 8/2012 | |
| EP | 2610270 | | 8/2012 | |
| EP | 2586825 | A1 * | 5/2013 | ............ C08L 23/14 |
| EP | 2586825 | A1 | 5/2013 | |
| EP | 2610271 | | 7/2013 | |
| EP | 2610272 | | 7/2013 | |
| EP | 2947118 | A1 * | 11/2015 | ........... C08F 210/06 |
| RU | 2451699 | C2 | 5/2012 | |
| RU | 2510407 | C2 | 3/2014 | |
| WO | 92/12182 | | 12/1991 | |
| WO | 9837144 | A1 | 8/1998 | |
| WO | 99/24478 | | 5/1999 | |
| WO | 99/24479 | | 11/1999 | |
| WO | 00/68315 | | 5/2000 | |
| WO | 200177224 | A1 | 10/2001 | |
| WO | 2004/000899 | | 6/2002 | |
| WO | 2004/111095 | | 12/2004 | |
| WO | 2008011843 | A1 | 5/2008 | |
| WO | 2010149529 | A1 | 12/2010 | |
| WO | 2011039314 | A1 | 4/2011 | |
| WO | 2012007430 | | 7/2011 | |
| WO | 2013041508 | A1 | 3/2013 | |
| WO | 2013092620 | | 6/2013 | |
| WO | 2014094990 | A2 | 6/2014 | |
| WO | WO-2014094990 | A2 * | 6/2014 | ............ C08L 19/00 |
| WO | 2014187686 | | 11/2014 | |

OTHER PUBLICATIONS

"QUEO 8230 Plastomer/Elastomer", Product Data Sheet, Borealis AG, Feb. 27, 2017, 3 pages.

Notice of Opposition for European Patent Application No. EP3458513 dated Jul. 6, 2022, 15 pages.

Busico, et al., "Alk-1-ene Polymerization in the Presence of a Monocyclopentadienyl Zirconium(iv) Acetamidinate Catalyst: Microstructural and Mechanistic Insightsa," Macromolecular Journals, 2007, vol. 28, pp. 1128-1134, WILEY-VCH Verlag GmbH & Co. KGaA, Weinheim.

Cheng, H.N., "C NMR Analysis of Ethylene-Propylene Rubbers," Macromolecules, 1984, vol. 17, No. 10, pp. 1950-1955, American Chemical Society.

International Search Report and Written Opinion for Application No. PCT/EP2017/061659, dated Jul. 7, 2017, 13 pgs.

Resconi, et al., "Selectivity in Propene Polymerization with Metallocene Catalysts," Chemical Reviews, 2000, vol. 100, pp. 1253-1345, American Chemical Society.

Wang, et al., "Structural Analysis of Ethylene/Propylene Copolymers Synthesized with a Constrained Geometry Catalyst," Macromolecules, 2000, vol. 33, pp. 1157-1162, American Chemical Society.

Zhou, et al., "A new decoupling method for accurate quantification of polyethylene copolymer composition and triad sequence distribution with 13C NMR," Journal of Magnetic Resonance, 2007, vol. 187, pp. 225-233, Elsevier.

Kakugo, et al., "C NMR Determination of Monomer Sequence Distribution in Ethylene-Propylene Copolymers Prepared with s-TiCL 13-AL (C2H5)2C1," Macromolecules, vol. 15, 1982, pp. 1150-1152, American Chemical Society.

Singh, et al., Triad Sequence Determination of Ethylene-Propylene Copolymers—Application of Quantitative 13C NMR, Polymer Testing, 29, 2009, pp. 475-479.

Zweifel, H., "Plastics Additives Handbook," 6th Edition, 2009, pp. 1140-1191, Hanser Publishers, Munich.

Nello Pasquini, et al., "Polypropylene Handbook", Product Technology Market, Hanser Publisher, Munich, Hanser Gardner Publications, Cincinnati, Second Edition, 2005, 7 pages.

Maria Carmela Sacchi et al., "Polymeritzation Stereochemistry with Ziegler-Natta Catalysts Containing Dialkylpropane Diethers: A Tool for Understanding Internal/External Donor Relationships", Macromolecules 1996 American Chemical Society, vol. 29, No. 10, pp. 3341-3345.

Maria Carmela Sacchi et al., "Role of the Pair of Internal and External Donors in MgCl2-Supported Ziegler-Natta Catalysts", Macromolecules 1991 American Chemical Society, vol. 24, No. 26 pp. 6823-6826.

Product Data of Engage 8200 from Dow Elastomrs (Year 2011).
Product Data of SD233CF from Borealis (Year 2013).
English Translation of Office Action dated Mar. 5, 2019 for Russian Application 2018142131, 6 pages.
English Translation of Chinese Office Action for Application 201780026492.3 dated Jul. 24, 2020, 7 pages.

* cited by examiner

Flexural modulus and film haze of the inventive and comparative examples

SOFT AND TRANSPARENT PROPYLENE COMPOLYMERS

CROSS-REFERENCE TO RELATED APPLICATION(S)

This application is a continuation of U.S. patent application Ser. No. 16/095,212, filed on Oct. 19, 2018, which is a national phase entry under 35 U.S.C. § 371 of International Application No. PCT/EP2017/061659, filed on May 16, 2017, which claims the benefit of priority of European Patent Application No. 16170177.6, filed on May 18, 2016. The contents of these applications are hereby incorporated by reference herein in their entirety.

The present invention is directed to a polypropylene composition (C) comprising a heterophasic propylene copolymer (RAHECO) and a plastomer (PL) as well as a process for the preparation of said polypropylene composition and a film obtained from said polypropylene composition (C).

There is an increasing trend in the food packaging and medical packaging industry to use plastic materials. Packaging films made of heterophasic propylene copolymers (RAHECOs) comprising a crystalline matrix and rubber phase dispersed within said matrix are widely used in the field of food and medical packaging. For such applications, packaging materials with good optical properties in combination with softness are required. It is known that the softness of a heterophasic propylene copolymer (RAHECO) can be increased by increasing the overall amount of the rubber phase, but following this approach, the optical properties are impaired due to the different densities of matrix and rubber phase. The optical properties can indeed be improved by using a rubber phase having a very low intrinsic viscosity, but this in turn leads to problems in production since the resulting powder is very sticky.

Accordingly, there is still a need in the art for providing a soft heterophasic system having improved optical properties.

Thus, it is an object of the present invention to provide a polypropylene composition (C) comprising a heterophasic system with an optimized or improved balance between mechanical and optical properties.

The finding of the present invention is to provide a polypropylene composition (C) comprising a heterophasic propylene copolymer (RAHECO) and a plastomer (PL).

Accordingly, the present invention is directed to a polypropylene composition (C), comprising
i) a heterophasic propylene copolymer (RAHECO), said heterophasic propylene copolymer comprising a matrix (M) being a random propylene copolymer (R-PP) and an elastomeric propylene copolymer (E) dispersed in said matrix (M), and
ii) a plastomer (PL) being a copolymer of ethylene and at least one $C_4$ to $C_{20}$ α-olefins having a density below 0.900 g/cm$^3$.

In one embodiment of the present invention, the polypropylene composition (C) has at least two glass transition temperatures Tg(1) and Tg(2), the first glass transition temperature Tg(1) relates to the matrix (M) while the second glass transition temperature Tg(2) relates to the dispersed elastomeric propylene copolymer (E), wherein further the second glass transition temperature fulfils the inequation (I), $$Tg(2) > 9.0 - 2.0 \times C(XCS) \quad \text{(I)}$$

wherein
Tg(2) is the second glass transition temperature of the polypropylene composition (C) and C(XCS) is the comonomer content [in mol-%] of the xylene cold soluble fraction (XCS) of the polypropylene composition (C).

In a further embodiment of the present invention, the polypropylene composition (C) has at least two glass transition temperatures Tg(1)' and Tg(2)', wherein the second glass transition temperature fulfils the inequation (II), $$Tg(2)' > 10.0 - 1.80 \times C(XCS)' \quad \text{(II)}$$

wherein
Tg(2)' is the second glass transition temperature of the polypropylene composition (C) and C(XCS)' is the propylene content [in mol-%] of the xylene cold soluble fraction (XCS) of the polypropylene composition (C).

In another embodiment of the present invention, the melt flow rate MFR$_2$ (230° C./2.16 kg) measured according to ISO 1133 of the polypropylene composition (C) is in the range of 1.0 to 30 g/10 min.

In one embodiment of the present invention, the polypropylene composition (C) has
i) a xylene cold soluble content (XCS) in the range of 10.0 to 45.0 wt.-%, and/or
ii) a propylene content in the range of 65.0 to 95.0 mol.-%.

In a further embodiment of the present invention, the polypropylene composition (C) has a melting temperature of at least 135° C.

In another embodiment of the present invention, the polypropylene composition (C) has
i) a flexural modulus measured according to ISO 178 below 600 MPa and/or
ii) a haze according to ASTM D 1300-00 measured on a 50 μm thick cast film below 3.0%.

In one embodiment of the present invention, the polypropylene composition (C) has an intrinsic viscosity (IV) determined according to DIN ISO 1628/1 (in Decalin at 135° C.) of the xylene soluble content (XCS) in the range of 0.7 to 2.0 dl/g.

In one embodiment of the present invention, the polypropylene composition (C) comprises 60 to 99 wt.-% of the heterophasic propylene copolymer (RAHECO) and 1 to 40 wt.-% of the plastomer (PL).

As outlined above, the heterophasic propylene copolymer (RAHECO) comprises a matrix (M) being a random propylene copolymer (R-PP) and an elastomeric propylene copolymer (E) dispersed in said matrix (M).

In another embodiment of the present invention, the comonomers of the random propylene copolymer (R-PP) and/or the comonomers of the elastomeric propylene copolymer (E) are ethylene and/or $C_4$ to $C_8$ α-olefins.

In a further embodiment of the present invention, the random propylene copolymer (R-PP) comprises a first propylene copolymer fraction (R-PP1) and a second propylene copolymer fraction (R-PP2) and the comonomer contents of the random propylene copolymer (R-PP) and the first propylene copolymer fraction (R-PP1) fulfil inequation (III), $$\frac{Co(RPP)}{Co(RPP1)} \geq 0.8, \quad \text{III}$$

wherein Co(RPP) is the comonomer content of the random propylene copolymer (R-PP) and Co(RPP1) is the comonomer content of the first propylene copolymer fraction (R-PP1).

In one embodiment of the present invention, the heterophasic propylene copolymer (RAHECO) has
a) a melt flow rate MFR$_2$ (230° C./2.16 kg) measured according to ISO 1133 in the range of 2.0 to 25.0 g/10 min, and/or
b) a xylene cold soluble content (XCS) in the range of 10.0 to 40.0 wt.-% having a comonomer content below 50.0 mol-%, and/or
c) a comonomer content in the range of 1.5 to 20.0 mol-%.

In one embodiment of the present invention, the comonomer of the plastomer (PL) is 1-octene.

In a further embodiment of the present invention, the plastomer (PL) has a melt flow rate MFR (190° C./2.16 kg) measured according to ISO 1133 below 50 g/10 min.

The present invention is further directed to a film, comprising the inventive polypropylene composition (C).

The present invention is also directed to a polymerization process for producing the polypropylene composition, (C) comprising the steps of
a) providing a plastomer (PL) being a copolymer of ethylene and at least one $C_4$ to $C_{20}$ α-olefins,
b) polymerizing in a first reactor (R1) propylene and ethylene and/or a $C_4$ to $C_8$ α-olefins, obtaining a first random propylene copolymer fraction (R-PP1),
c) transferring the first random propylene copolymer fraction (R-PP1) into a second reactor (R2),
d) polymerizing in said second reactor (R2) in the presence of the first random propylene copolymer fraction (R-PP1) propylene and ethylene and/or a $C_4$ to $C_8$ α-olefin, obtaining a second random copolymer fraction (R-PP2), said first random propylene copolymer fraction (R-PP1) and said second random propylene copolymer fraction (R-PP2) forming the random propylene copolymer (R-PP),
e) transferring said random propylene copolymer (R-PP) into a third reactor (R3),
f) polymerizing in said third reactor (R3) in the presence of the random propylene copolymer (R-PP) propylene and/or a $C_4$ to $C_8$ α-olefins, obtaining a third polymer fraction, said polymer fraction is the elastomeric copolymer (E), said propylene copolymer (R-PP) and said elastomeric propylene copolymer (E) form the heterophasic propylene copolymer (RAHECO),
g) melt blending the heterophasic propylene copolymer (RAHECO) obtained in step f) with the plastomer (PL) of step a).

DETAILED DESCRIPTION

Figure 1:
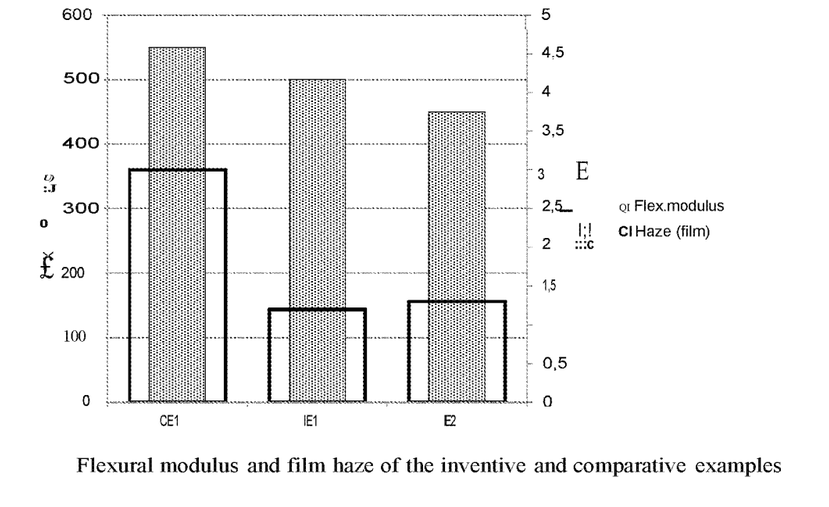
The Figure depicts the flexural modulus and film haze of the inventive and comparative examples.

In the following, the present invention is described in more detail.
The Composition (C)
The inventive polypropylene composition (C) is especially featured by its specific optical and mechanical properties.

Accordingly, it is preferred that the polypropylene composition (C) has a flexural modulus measured according to ISO 178 below 600 MPa. For example, the polypropylene composition (C) has a flexural modulus measured according to ISO 178 in the range of 200 to 580 MPa or in the range of 300 to 550 MPa.

Preferably not only the polypropylene composition (C) is features by said specific flexural modulus, but also the film comprising the polypropylene composition (C) when measured under the same conditions as indicated above. Accordingly, the above indicated values of flexural modulus are equally applicable for the film.

With regard to the optical properties, it is preferred that the polypropylene composition (C) has a haze according to ASTM D 1003-00 measured on a 50 μm thick cast film below 3.0%, more preferably below 2.5%, still more preferably below 1.5%.

The polypropylene composition (C) according to this invention is featured by a moderate melt flow rate. Accordingly, the polypropylene composition (C) has a melt flow rate MFR$_2$ (230° C./2.16 kg) measured according to ISO 1133 in the range of 1.0 to 30 g/10 min, preferably in the range of 2.5 to 20 g/10 min, more preferably in the range of 5.0 to 15 g/10 min, still more preferably in the range of 7.0 to 12.0 g/10 min.

Preferably, the polypropylene composition (C) has a xylene soluble content (XCS) in the range of 10.0 to 45.0 wt.-%, more preferably in the range of 12.0 to 35.0 wt.-%, still more preferably in the range of 18.0 to 33.0 wt.-%.

Preferably, the propylene content of the xylene soluble fraction (XCS) of the polypropylene composition (C) is in the range of 0.7 to 2.5 dl/g, more preferably in the range of 0.8 to 2.2 dl/g, still more preferably in the range of 0.9 to 2.0 dl/g.

Preferably, it is desired that the polypropylene composition (C) is thermo mechanically stable.

Accordingly, it is appreciated that the polypropylene composition (C) has a melting temperature of at least 135° C., more preferably in the range of 135 to 155° C., still more preferably in the range of 138 to 150° C.

Typically, the polypropylene composition (C) has a rather low crystallization temperature, i.e. of not more than 110° C., more preferably in the range of 95 to 110° C., still more preferably in the range of 100 to 108° C.

As mentioned above, the polypropylene composition (C) has at least two distinct glass transition temperatures Tg(1)' and Tg(2)'.

Accordingly, it is one preferred requirement of the present invention, that the polypropylene composition (C) has a second glass transition temperature Tg(2)' fulfilling the inequation (I), more preferably the inequation (Ia), $$Tg(2)' > 9.0 - 2.0 \times C(XCS)' \quad (I)$$

$$Tg(2)' > 10.0 - 1.80 \times C(XCS)' \quad (Ia)$$

wherein
Tg(2)' is the second glass transition temperature of the polypropylene composition (C), C(XCS)' is the propylene content [in mol-%] of the xylene cold soluble fraction (XCS) of the polypropylene composition (C).

Preferably the second glass transition temperature Tg(2)' is below −15° C., like below −25° C., more preferably is in the range of −60 to −45° C., still more preferably in the range of −58 to −48° C. It is especially preferred that the polypropylene composition (C) has a second glass transition temperature Tg(2)' as mentioned in this paragraph and fulfilling the in-equation (I) as defined in the present invention.

The first glass transition temperature Tg(1)' is preferably above the second glass transition temperature Tg(2)'. Still more preferably the difference between the first glass transition temperature Tg(1)' and second glass transition temperature Tg(2)' is at least 35° C., more preferably at least 40° C., yet more preferably in the range of 40 to 50° C., still more preferably in the range of 41 to 48° C.

The polypropylene composition (C) comprises apart from propylene also comonomers. Preferably the polypropylene composition (C) comprises apart from propylene ethylene and/or $C_4$ to $C_8$ α-olefins. Accordingly, the term "polypropylene composition" according to this invention is understood as a polypropylene comprising, preferably consisting of, units derivable from
(a) propylene
and
(b) ethylene and/or $C_4$ to $C_8$ α-olefins.

Preferably, the polypropylene composition (C) has a propylene content in the range of 65.0 to 95.0 mol.-%, more preferably in the range of 70.0 to 90.0 mol.-%, still more preferably in the range of 72.0 to 88.0 mol.-%.

The inventive polypropylene composition (C) comprises a heterophasic propylene copolymer (RAHECO) and a plastomer (PL). Preferably, the polypropylene composition (C) comprises, more preferably consists of, 60 to 99 wt.-%, more preferably 70 to 97 wt.-%, still more preferably 80 to 96 wt.-% of the heterophasic propylene copolymer (RAHECO) and 1 to 40 wt.-%, more preferably 3 to 30 wt.-%, still more preferably 4 to 20 wt.-% of the plastomer (PL).

Preferably, the weight ratio between the heterophasic propylene copolymer (RAHECO) and the plastomer (PL) ranges from 50:1 to 2:1, more preferably from 30:1 to 3:1, still more preferably from 20:1 to 4:1.

As mentioned above, the heterophasic propylene copolymer composition (C) comprises a matrix (M) being a random propylene copolymer (R-PP) and an elastomeric propylene copolymer (E) dispersed in said matrix (M).

Preferably, the polypropylene composition (C) comprises, more preferably consists of, 60 to 90 wt.-% of the matrix (M), more preferably 65 to 86 wt.-%, still more preferably 70 to 84 wt.-%. Accordingly, the polypropylene composition (C) preferably comprises 6 to 25 wt.-% of the elastomeric propylene copolymer (E), more preferably 8 to 18 wt.-%, still more preferably 10 to 15 wt.-%.

Thus, it is preferred that the polypropylene composition (C) comprises, more preferably consists of, 60 to 90 wt.-% of the matrix (M), more preferably 65 to 86 wt.-%, still more preferably 70 to 84 wt.-%, 6 to 25 wt. % of the elastomeric propylene copolymer (E), more preferably 8 to 18 wt.-%, still more preferably 10 to 15 wt.-% and 1 to 40 wt.-%, more preferably 3 to 30 wt.-%, still more preferably 4 to 20 wt.-% of the plastomer (PL).

The polypropylene composition (C) of the present invention may include additives (AD). Accordingly, it is preferred that the polypropylene composition (C) comprises, more preferably consists of, 60 to 99 wt.-%, more preferably 70 to 97 wt.-%, still more preferably 80 to 95 wt.-% of the heterophasic propylene copolymer (RAHECO), 1 to 40 wt.-%, more preferably 3 to 30 wt.-%, still more preferably 5 to 20 wt.-% of the plastomer (PL) and 1 to 5 wt.-%, more preferably 3 to 4 wt.-% of additives (AD). The additives (AD) are described in more detail below.

Preferably the polypropylene composition (C) of the invention does not comprise (a) further polymer (s) different to the heterophasic propylene copolymer (RAHECO) and the plastomer (PL), in an amount exceeding 10 wt.-%, preferably in an amount exceeding 7 wt.-%, more preferably in an amount exceeding 5 wt.-%, based on the weight of the polpropylene composition (C).

In the following, the heterophasic propylene copolymer (RAHECO) and the plastomer (PL) are described in more detail.

The Heterophasic Propylene Copolymer (RAHECO)

The inventive polypropylene composition (C) comprises a heterophasic propylene copolymer (RAHECO).

The heterophasic propylene copolymer (RAHECO) according to this invention comprises a matrix (M) being a random propylene copolymer (R-PP) and dispersed therein an elastomeric propylene copolymer (E). Thus the matrix (M) contains (finely) dispersed inclusions being not part of the matrix (M) and said inclusions contain the elastomeric propylene copolymer (E). The term inclusion indicates that the matrix (M) and the inclusion form different phases within the heterophasic propylene copolymer (RAHECO). The presence of second phases or the so called inclusions are for instance visible by high resolution microscopy, like electron microscopy or atomic force microscopy, or by dynamic mechanical thermal analysis (DMTA). Specifically, in DMTA the presence of a multiphase structure can be identified by the presence of at least two distinct glass transition temperatures.

Preferably, the heterophasic propylene copolymer (RAHECO) according to this invention comprises as polymer components only the random propylene copolymer (R-PP) and the elastomeric propylene copolymer (E). In other words, the heterophasic propylene copolymer (RAHECO) may contain further additives but no other polymer in an amount exceeding 5.0 wt.-%, more preferably exceeding 3.0 wt.-%, like exceeding 1.0 wt.-%, based on the total heterophasic propylene copolymer (RAHECO). One additional polymer which may be present in such low amounts is a polyethylene which is a by-reaction product obtained by the preparation of the heterophasic propylene copolymer (RAHECO). Accordingly, it is in particular appreciated that the instant heterophasic propylene copolymer (RAHECO) contains only the random propylene copolymer (R-PP), the elastomeric propylene copolymer (E) and optionally polyethylene in amounts as mentioned in this paragraph.

The heterophasic propylene copolymer (RAHECO) applied according to this invention is featured by a moderate melt flow rate. Accordingly, the heterophasic propylene copolymer (RAHECO) has a melt flow rate $MFR_2$ (230° C./2.16 kg) in the range of 2.0 to 25.0 g/10 min, preferably in the range of 2.5 to 12.0 g/10 min, more preferably in the range of 3.0 to 10.0 g/10 min.

Preferably, it is desired that the heterophasic propylene copolymer (RAHECO) is thermo mechanically stable. Accordingly, it is appreciated that the heterophasic propylene copolymer (RAHECO) has a melting temperature of at least 135° C., more preferably in the range of 135 to 160° C., still more preferably in the range of 137 to 155° C.

Typically, the heterophasic propylene copolymer (RAHECO) has a rather low crystallization temperature, i.e. of not more than 110° C., more preferably in the range of 95 to 110° C., still more preferably in the range of 100 to 108° C.

The heterophasic propylene copolymer (RAHECO) comprises apart from propylene also comonomers. Preferably the heterophasic propylene copolymer (RAHECO) comprises apart from propylene ethylene and/or $C_4$ to $C_8$ α-olefins. Accordingly, the term "propylene copolymer" according to this invention is understood as a polypropylene comprising, preferably consisting of, units derivable from
propylene
and
(b) ethylene and/or $C_4$ to $C_8$ α-olefins.

Thus, the heterophasic propylene copolymer (RAHECO), i.e. the random propylene copolymer (R-PP) such as the first propylene copolymer fraction (R-PP1) and the second propylene copolymer fraction (R-PP2), as well as the elastomeric propylene copolymer (E), comprises monomers copolymerizable with propylene, for example comonomers such as ethylene and/or $C_4$ to $C_8$ α-olefins, in particular ethylene and/or $C_4$ to $C_8$ α-olefins, e.g. 1-butene and/or 1-hexene. Preferably, the heterophasic propylene copolymer (RAHECO) according to this invention comprises, especially consists of, monomers copolymerizable with propylene from the group consisting of ethylene, 1-butene and 1-hexene. More specifically, the heterophasic propylene copolymer (RAHECO) of this invention comprises—apart from propylene—units derivable from ethylene and/or 1-butene. In a preferred embodiment, the heterophasic propylene copolymer (RAHECO) according to this invention comprises units derivable from ethylene and propylene only. Still more preferably the random propylene copolymer (R-PP), i.e. the first propylene copolymer fraction (R-PP1) and the second propylene copolymer fraction (R-PP2), as well as the elastomeric propylene copolymer (E) of the heterophasic propylene copolymer (RAHECO) contain the same comonomers, like ethylene.

Accordingly, the elastomeric propylene copolymer (E) is preferably an ethylene propylene rubber (EPR), whereas the random propylene copolymer (R-PP) is a random ethylene propylene copolymer (R-PP).

Additionally, it is appreciated that the heterophasic propylene copolymer (RAHECO) preferably has a moderate total comonomer content, preferably ethylene content, which contributes to the softness of the material. Thus, it is preferred that the comonomer content of the heterophasic propylene copolymer (RAHECO) is in the range from 1.5 to 20.0 mol.-%, preferably in the range from 4.0 to 15.0 mol.-%, more preferably in the range from 6.0 to 13.0 mol.-%.

The xylene cold soluble (XCS) fraction measured according to according ISO 16152 (25° C.) of the heterophasic propylene copolymer (RAHECO) is in the range of 10.0 to 40.0 wt.-%, preferably in the range from 12.0 to 35.0 wt.-%, more preferably in the range from 16.0 to 30.0 wt.-%, still more preferably in the range from 18.0 to 25.0 wt.-%.

Further it is appreciated that the xylene cold soluble (XCS) fraction of the heterophasic propylene copolymer (RAHECO) is specified by its intrinsic viscosity. A low intrinsic viscosity (IV) value reflects a low weight average molecular weight. For the present invention it is appreciated that the xylene cold soluble fraction (XCS) of the heterophasic propylene copolymer (RAHECO) has an intrinsic viscosity (IV) measured according to ISO 1628/1 (at 135° C. in decalin) in the range of 0.8 to below 2.5 dl/g, preferably in the range of 1.0 to 2.2 dl/g, more preferably in the range of 1.2 to below 2.0 dl/g.

Additionally, it is preferred that the comonomer content, i.e. ethylene content, of the xylene cold soluble (XCS) fraction of the heterophasic propylene copolymer (RAHECO) is below 50.0 mol-%, more preferably in the range of 20.0 to 48.0 mol-%, still more preferably in the range of 25.0 to 46.0 mol-%, yet more preferably in the range of 30.0 to 45.0 mol-%. The comonomers present in the xylene cold soluble (XCS) fraction are those defined above for the random propylene copolymer (R-PP) and the elastomeric propylene copolymer (E), respectively. In one preferred embodiment the comonomer is ethylene only.

The heterophasic propylene copolymer (RAHECO) can be further defined by its individual components, i.e. the random propylene copolymer (R-PP) and the elastomeric propylene copolymer (E).

The random propylene copolymer (R-PP) comprises monomers copolymerizable with propylene, for example comonomers such as ethylene and/or $C_4$ to $C_8$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) of this invention comprises—apart from propylene—units derivable from ethylene and/or 1-butene. In a preferred embodiment the random propylene copolymer (R-PP) comprises units derivable from ethylene and propylene only.

As mentioned above the heterophasic propylene copolymer (RAHECO) is featured by a moderate comonomer content. Accordingly, the comonomer content of the random propylene copolymer (R-PP) is in the range of 4.4 to 7.3 mol-%, yet more preferably in the range of 4.8 to 6.5 mol %, still more preferably in the range of 5.0 to 6.0 mol-%.

The term "random" indicates that the comonomers of the random propylene copolymer (R-PP), as well as of the first propylene copolymer fraction (R-PP1) and the second propylene copolymer fraction (R-PP2) are randomly distributed within the propylene copolymers. The term random is understood according to IUPAC (Glossary of basic terms in polymer science; IUPAC recommendations 1996).

The random propylene copolymer (R-PP) preferably comprises at least two polymer fractions, like two or three polymer fractions, all of them are propylene copolymers. Even more preferred the random propylene copolymer (R-PP) comprises, preferably consists of, a first propylene copolymer fraction (R-PP1) and a second propylene copolymer fraction (R-PP2).

Concerning the comonomers used for the first propylene copolymer fraction (R-PP1) and second propylene copolymer fraction (R-PP2) reference is made to the comonomers of the random propylene copolymer (R-PP). Preferably the first propylene copolymer fraction (R-PP1) and the second propylene copolymer fraction (R-PP2) contain the same comonomers, like ethylene.

The heterophasic propylene copolymer (RAHECO) preferably comprises 60 to 95 wt.-%, more preferably 60 to 90 wt.-%, still more preferably 60.0 to 87.0 wt.-% of the random propylene copolymer (R-PP), based on the total weight of the heterophasic propylene copolymer (RAHECO).

Additionally, the heterophasic propylene copolymer (RAHECO) preferably comprises 5 to 40 wt.-%, more preferably 10 to 40 wt.-%, still more preferably 13.0 to 40.0 wt.-% of the elastomeric propylene copolymer (E), based on the total weight of the heterophasic propylene copolymer (RAHECO).

Thus, it is appreciated that the heterophasic propylene copolymer (RAHECO) preferably comprises, more preferably consists of, 60 to 95 wt.-%, more preferably 60 to 90 wt.-%, still more preferably 60.0 to 87.0 wt.-% of the random propylene copolymer (R-PP) and 5 to 40 wt.-%, more preferably 10 to 40 wt.-%, still more preferably 13.0 to 40.0 wt.-% of the elastomeric propylene copolymer (E), based on the total weight of the heterophasic propylene copolymer (RAHECO).

Accordingly, a further component of the heterophasic propylene copolymer (RAHECO) is the elastomeric propylene copolymer (E) dispersed in the matrix (M). Concerning the comonomers used in the elastomeric propylene copolymer (E) it is referred to the information provided for the heterophasic propylene copolymer (RAHECO). Accordingly, the elastomeric propylene copolymer (E) comprises monomers copolymerizable with propylene, for example comonomers such as ethylene and/or $C_4$ to $C_8$ α-olefins, in particular ethylene and/or $C_4$ to $C_8$ α-olefins, e.g. 1-butene and/or 1-hexene. Preferably, the elastomeric propylene copolymer (E) comprises, especially consists of, monomers copolymerizable with propylene from the group consisting of ethylene, 1-butene and 1-hexene. More specifically, the elastomeric propylene copolymer (E) comprises—apart from propylene—units derivable from ethylene and/or 1-butene. Thus, in an especially preferred embodiment the elastomeric propylene copolymer (E) comprises units derivable from ethylene and propylene only.

The comonomer content of the elastomeric propylene copolymer (E) preferably is in the range of 30.0 to 55.0 mol-%, more preferably in the range of 33.0 to 52.0 mol-%, still more preferably in the range of 35.0 to 50.0 mol-%.

As mentioned above multiphase structures can be identified by the presence of at least two distinct glass transition temperatures. The higher first glass transition temperature (Tg(1)) represents the matrix whereas the lower second glass transition temperature (Tg(2)) reflects the elastomeric propylene copolymer (E) of the heterophasic propylene copolymer (RAHECO).

Accordingly, it is one preferred requirement of the present invention, that the heterophasic propylene copolymer (RAHECO) has a second glass transition temperature Tg(2) fulfilling the inequation (II), more preferably the inequation (IIa), $$Tg(2) > 9.0 - 2.0 \times C(XCS) \quad (II)$$

$$Tg(2) > 10.0 - 1.80 \times C(XCS) \quad (IIa)$$

wherein
Tg(2) is the second glass transition temperature of the heterophasic propylene copolymer (RAHECO);
C(XCS) is the comonomer content [in mol-%] of the xylene cold soluble fraction (XCS) of the heterophasic propylene copolymer (RAHECO).

Preferably the second glass transition temperature Tg(2) is below −20° C., like below −35° C., more preferably is in the range of −65 to −45° C., still more preferably in the range of −62 to −48° C. It is especially preferred that the heterophasic propylene copolymer (RAHECO) has a second glass transition temperature Tg(2) as mentioned in this paragraph and fulfilling the in-equation (I) as defined in the present invention.

It is further appreciated that the heterophasic propylene copolymer (RAHECO) according to this invention has additionally a first glass transition temperature Tg(1) (representing the matrix (M) of the heterophasic propylene copolymer (RAHECO)) in the range of −12 to +2° C., more preferably in the range of −10 to +2° C.

Accordingly the first glass transition temperature Tg(1) is preferably above the second glass transition temperature Tg(2). Still more preferably the difference between the first glass transition temperature Tg(1) and second glass transition temperature Tg(2) is at least 40° C., more preferably at least 45° C., yet more preferably in the range of 40 to 60° C., still more preferably in the range of 45 to 56° C.

As indicated above, the random propylene copolymer (R-PP) preferably comprises at least two polymer fractions, like two or three polymer fractions, all of them are propylene copolymers.

Even more preferred the random propylene copolymer (R-PP) comprises, preferably consists of, a first propylene copolymer fraction (R-PP1) and a second propylene copolymer fraction (R-PP2). It is preferred that the first propylene copolymer fraction (R-PP1) is the comonomer lean fraction whereas the second propylene copolymer fraction (R-PP2) is the comonomer rich fraction.

Preferably, the comonomer contents of the random propylene copolymer (R-PP) and the first propylene copolymer fraction (R-PP1) fulfil inequation (III), more preferably inequation (IIIa), still more preferably inequation (IIIb), $$\frac{Co(RPP)}{Co(RPP1)} \geq 0.8, \quad (III)$$

$$\frac{Co(RPP)}{Co(RPP1)} \geq 1.0, \quad (IIIa)$$

$$\frac{Co(RPP)}{Co(RPP1)} \geq 1.4, \quad (IIIb)$$

wherein Co(RPP) is the comonomer content [mol.-%] of the random propylene copolymer (R-PP) and Co(RPP1) is the comonomer content [mol.-%] of the first propylene copolymer fraction (R-PP1).

Preferably, the first propylene copolymer fraction (R-PP1) and the second propylene copolymer fraction (R-PP2) differ in the comonomer content.

Preferably one of the propylene copolymer fractions (R-PP1) and (R-PP2) of the random propylene copolymer (R-PP) is the comonomer lean fraction and the other fraction is the comonomer rich fraction, wherein further the lean fraction and the rich fraction fulfil inequation (IV), more preferably inequation (IVa), still more preferably inequation (IVb), $$\frac{Co(\text{lean})}{Co(\text{rich})} \leq 0.80, \quad (IV)$$

$$0.11 \frac{Co(\text{lean})}{Co(\text{rich})} \leq 0.67, \quad (IVa)$$

$$0.25 \frac{Co(\text{lean})}{Co(\text{rich})} \leq 0.57, \quad (IVb)$$

wherein Co (lean) is the comonomer content [mol.-%] of the random propylene copolymer fraction with the lower comonomer content and Co (rich) is the comonomer content [mol.-%] of the random propylene copolymer fraction with the higher comonomer content.

Preferably, the first propylene copolymer fraction (R-PP1) is the random copolymer fraction with the lower comonomer content and the second propylene copolymer fraction (R-PP2) is the random copolymer fraction with the higher comonomer content.

Accordingly, it is preferred that the first propylene copolymer fraction (R-PP1) has a comonomer content in the range of 0.8 to 6.0 mol.-%, more preferably in the range of 1.5 to 4.5 mol.-%, still more preferably in the range of 2.2 to 4.1 mol.-% and/or that the second propylene copolymer fraction has a comonomer content in the range of 6.2 to 17.0 mol.-%, more preferably in the range of 6.5 to 11.5 mol.-%, still more preferably in the range of 7.0 to 8.8 wt.-%, based on the overall fractions (R-PP1) and (R-PP2), respectively.

The random propylene copolymer (R-PP) according to this invention has a melt flow rate $MFR_2$ (230° C./2.16 kg) measured according to ISO 1133 in the range of 5.0 to 15.0 g/10 min, more preferably in the range of 6.0 to 12.0 g/10 min, still more preferably in the range of 7.0 to 9.0 g/10 min.

Further it is preferred that the first propylene copolymer fraction (R-PP1) and the second propylene copolymer fraction (R-PP2) have nearby the same melt flow rate. Accordingly, it is preferred that difference between the melt flow rate of the random propylene copolymer (R-PP) and the first propylene copolymer fraction (R-PP1) [MFR(Pre-R-PP)−MFR(Pre-R-PP1)] is below +/−2.5 g/10 min, more preferably +/−2.0 g/10 min, yet more preferably +/−1.5 g/10 min.

Thus, in one embodiment the first propylene copolymer fraction (R-PP1) and the second propylene copolymer fraction (R-PP2) have a melt flow rate $MFR_2$ (230° C./2.16 kg) in the range of 5.0 to 15.0 g/10 min.

The heterophasic propylene copolymer (RAHECO) as defined in the instant invention may contain up to 5.0 wt.-% additives, like nucleating agents and antioxidants, as well as slip agents and antiblocking agents. Preferably the additive content (without α-nucleating agents) is below 3.0 wt.-%, like below 1.0 wt.-%.

Further, the weight ratio between the first propylene copolymer fraction (R-PP1) and second propylene copolymer fraction (R-PP2) preferably is 20:80 to 80:20, more preferably 25:75 to 75:25, still more preferably 30:70 to 70:30.

The heterophasic propylene copolymer (RAHECO) is preferably produced in a multistage process comprising at least two reactors connected in series a heterophasic propylene copolymer (RAHECO) comprising a matrix (M) being a random propylene copolymer (PP) and an elastomeric propylene copolymer (E) dispersed in said matrix (M).

Preferably the heterophasic propylene copolymer (RAHECO) is obtained by a sequential polymerization process comprising the steps of
(a) polymerizing in a first reactor propylene and ethylene and/or $C_4$ to $C_8$ α-olefins obtaining thereby a first propylene copolymer fraction (R-PP1),
(b) transferring said first propylene copolymer fraction (R-PP1) in a second reactor,
(c) polymerizing in said second reactor in the presence of the first propylene copolymer fraction (R-PP1) propylene and ethylene and/or CU to Cg $C_8$ α-olefins obtaining a second propylene copolymer fraction (R-PP2), said first propylene copolymer fraction (R-PP1) and said second propylene copolymer fraction (R-PP2) form the matrix (PP),
(d) transferring said matrix (M) in a third reactor,
(e) polymerizing in said third reactor in the presence of the matrix (M) propylene and ethylene and/or $C_4$ to $C_8$ α-olefins obtaining an elastomeric propylene copolymer (E), said matrix (M) and said elastomeric propylene copolymer (E) form the heterophasic propylene copolymer (RAHECO).

For preferred embodiments of the heterophasic propylene copolymer (HECO), the random propylene copolymer (R-PP), the first propylene copolymer fraction (R-PP1), the second propylene copolymer fraction (R-PP2), and the elastomeric copolymer (E) reference is made to the definitions given above.

The term "sequential polymerization process" indicates that the heterophasic propylene copolymer (HECO) is produced in at least two, like three, reactors connected in series. Accordingly, the present process comprises at least a first reactor, a second reactor, and optionally a third reactor. The term "polymerization process" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization process.

The first reactor is preferably a slurry reactor and can be any continuous or simple stirred batch tank reactor or loop reactor operating in bulk or slurry. Bulk means a polymerization in a reaction medium that comprises of at least 60% (w/w) monomer. According to the present invention the slurry reactor is preferably a (bulk) loop reactor.

The second reactor and the third reactor are preferably gas phase reactors. Such gas phase reactors can be any mechanically mixed or fluid bed reactors. Preferably the gas phase reactors comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor is a slurry reactor, like loop reactor, whereas the second reactor and the third reactor (R3) are gas phase reactors (GPR). Accordingly, for the instant process at least three, preferably three polymerization reactors, namely a slurry reactor, like loop reactor, a first gas phase reactor and a second gas phase reactor are connected in series are used. If needed prior to the slurry reactor a pre-polymerization reactor is placed.

A preferred multistage process is a "loop-gas phase"-process, such as developed by Borealis A/S, Denmark (known as BORSTAR® technology) described e.g. in patent literature, such as in EP 0887379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (RAHECO) as defined above the conditions for the first reactor, i.e. the slurry reactor, like a loop reactor, may be as follows:
 the temperature is within the range of 50° C. to 110° C., preferably between 60° C. and 100° C., more preferably between 65° C. and 95° C.,
 the pressure is within the range of 20 bar to 80 bar, preferably between 40 bar to 70 bar,
 hydrogen can be added for controlling the molar mass in a manner known per se.

Subsequently, the reaction mixture of the first reactor is transferred to the second reactor, i.e. gas phase reactor, where the conditions are preferably as follows:
 the temperature is within the range of 50° C. to 130° C., preferably between 60° C. and 100° C.,
 the pressure is within the range of 5 bar to 50 bar, preferably between 15 bar to 35 bar,
 hydrogen can be added for controlling the molar mass in a manner known per se.

The condition in the third reactor is similar to the second reactor.

The residence time can vary in the three reactor zones.

In one embodiment of the process for producing the heterophasic propylene copolymer (RAHECO) the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor, i.e. in the slurry reactor, like in the loop reactor, and/or as a condensed mode in the gas phase reactors.

Preferably, the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 18 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (RAHECO) is obtained by a multistage polymerization process, as described above, in the presence of a catalyst system.

As pointed out above in the specific process for the preparation of the heterophasic propylene copolymer (RAHECO) as defined above, a specific Ziegler-Natta catalyst (ZN-C) must be used.

Accordingly, the Ziegler-Natta catalyst (ZN-C) will be now described in more detail.

The heterophasic propylene copolymer (RAHECO) applied according to this invention is preferably produced in the presence of (a) a Ziegler-Natta catalyst (ZN-C) comprising compounds (TC) of a transition metal of Group 4 to 6 of IUPAC, a Group 2 metal compound (MC) and an internal donor (ID);

(b) optionally a co-catalyst (Co), and (c) optionally an external donor (ED).

The catalyst used in the present invention is a solid Ziegler-Natta catalyst (ZN-C), which comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the catalyst is fully free of undesired phthalic compounds. Further, the solid catalyst is free of any external support material, like silica or $MgCl_2$, but the catalyst is selfsupported.

The Ziegler-Natta catalyst (ZN-C) can be further defined by the way as obtained. Accordingly, the Ziegler-Natta catalyst (ZN-C) is preferably obtained by a process comprising the steps of a)

$a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;

or $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;

or $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the Ziegler-Natta catalyst (ZN-C) can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step c).

In emulsion—solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C.

The catalyst prepared by emulsion—solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2- ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in amole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylene, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion—solidification method may be washed at least once, preferably at least twice, most preferably at least three times with an aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained Ziegler-Natta catalyst is desirably in the form of particles having generally an average particle size range of 5 to 200 μm, preferably 10 to 100. Particles are compact with low porosity and have surface area below 20 $g/m^2$, more preferably below 10 $g/m^2$. Typically, the amount of Ti is 1 to 6 wt-%, Mg 10 to 20 wt-% and donor 10 to 40 wt-% of the catalyst composition.

Detailed description of preparation of catalysts is disclosed in WO 2012/007430, EP 2415790, EP 2610270, EP 2610271 and EP 2610272 which are incorporated here by reference.

The Ziegler-Natta catalyst (ZN-C) is preferably used in association with an alkyl aluminum cocatalyst and optionally external donors.

The catalyst system which is used according to the present invention also comprises an aluminium alkyl compound, preferably of the general formula $AlR_{3-n}X_n$ wherein R stands for straight chain or branched alkyl group having 1 to 20, preferably 1 to 10 and more preferably 1 to 6 carbon atoms, X stands for halogen and n stands for 0, 1, 2 or 3, which aluminium alkyl compound is added, and brought into contact with the droplets of the dispersed phase of the agitated emulsion before recovering the solidified particles of the catalyst.

It is further preferred that at least a part of the aluminium compound is added, in pure form or in the form of a solution, from shortly before the beginning of the emulsion formation until adding it to the washing liquid, e.g. toluene, in such an amount that the final Al content of the particles is from 0.05 to 1 wt.-%, preferably 0.1 to 0.8 wt.-% and most preferably 0.2 to 0.7 wt.-% by weight of the final catalyst particles. The most preferred Al content may vary depending upon the type of the Al compound and on the adding step. For example, in some cases the most preferred amount may be 0.1 to 0.4 wt.-%.

Still further, preferably tri-($C_1$-$C_6$)-alkyl aluminum compounds are used, triethylaluminium being most preferred.

In Ziegler-Natta catalysts aluminium alkyl compounds are used as cocatalysts, i.e. for activating the catalyst. During activation of polypropylene catalysts, alkyl aluminium does not only reduce and alkylate the active metal, but it has also influence on the donor composition. It is well-known that alkyl aluminium compounds can remove carboxylic acid esters, which are used as internal donors. Simultaneously, external donors can be fixed on the catalyst. Typically, tri-ethyl aluminum (TEAl) is used as cocatalyst and silanes as external donors as is disclosed e.g. in articles Sacci, M. C; Forlini, F.; Tritto, I and Locatelli, P., Macromolecules, 1996, 29, 3341-3345 and Sacci, M. C; Tritto, I.; Shan, C. and Mendichi, R., Macromolecules, 1991, 24, 6823-6826.

In the catalysts used in the present invention, the internal donor, preferably substituted maleates and citraconates, can be significantly extracted from the catalyst with the use of the alkyl aluminium compound.

The extraction level is dependent on the concentration of the aluminium alkyl. The higher the concentration, the more of the internal donor can be extracted. Further, the addition of the external donor together with aluminium alkyl improves the donor exchange. The longer the reaction time is, the more external donor is bound on the catalyst.

As further component in the instant polymerization process an external donor (ED) is preferably present. Suitable external donors (ED) include certain silanes, ethers, esters, amines, ketones, heterocyclic compounds and blends of these. It is especially preferred to use a silane. It is most preferred to use silanes of the general formula $R^a_p R^b_q Si(OR^c)_{(4-p-q)}$ wherein $R^a$, $R^b$ and $R^c$ denote a hydrocarbon radical, in particular an alkyl or cycloalkyl group, and wherein p and q are numbers ranging from 0 to 3 with their sum p+q being equal 30 to or less than 3. $R^a$, $R^b$ and $R^c$ can be chosen independently from one another and can be the same or different. Specific examples of such silanes are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$, or of general formula $Si(OCH_2CH_3)_3(NR^3R^4)$ wherein $R^3$ and $R^4$ can be the same or different a represent a hydrocarbon group having 1 to 12 carbon atoms.

$R^3$ and $R^4$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R3 and R4 are independently selected from the group consisting of methyl, ethyl, n-propyl, n-butyl, octyl, decanyl, iso-propyl, iso-butyl, iso¬pentyl, tert.-butyl, tert.-amyl, neopentyl, cyclopentyl, cyclohexyl, methylcyclopentyl and cycloheptyl.

More preferably both $R^1$ and $R^2$ are the same, yet more preferably both $R^3$ and $R^4$ are an ethyl group.

Especially preferred external donors (ED) are the cyclohexylmethyl dimethoxy silane donor (C-Donor) or the pentyl dimethoxy silane donor (D-donor), the latter especially preferred.

It is preferred that a solution containing alkyl aluminium and external donor in an organic solvent, e.g. pentane, are added to the catalyst after solidification of the catalyst particles.

The catalyst which is obtained by the above described process is a nonsupported Ziegler-25 Natta catalyst. Nonsupported catalysts do not use any external carrier, contrary to conventional catalysts, e.g. conventional Ziegler-Natta catalysts, which are e.g. supported on silica or MgCl$_2$.

Further preferred embodiments of the catalyst system production include all preferred embodiments as described in WO 2014/187686 A1.

The Plastomer (PL)

The inventive polypropylene composition further comprises a plastomer (PL) being a copolymer of ethylene and a $C_4$ to $C_{20}$ α-olefin.

The plastomer (PL) can be any elastomeric polyolefin with the proviso that it chemically differs from the elastomeric propylene copolymer (E) as defined herein. More preferably the plastomer (PL) is a very low density polyolefin, still more preferably a very low density polyolefin polymerized using single site catalysis, preferably metallocene catalysis. Typically, the plastomer (PL) is an ethylene copolymer.

The plastomer (PL) has a density below 0.900 g/cm$^3$. More preferably, the density of the plastomer (PL) is equal or below 0.890 g/cm$^3$, still more preferably in the range of 0.845 to 0.890 g/cm$^3$.

Preferably, the plastomer (PL) has a melt flow rate MFR$_2$ (190° C./2.16 kg) of less than 50 g/10 min, more preferably from 10.0 to 40 g/10 min, still more preferably from 15.0 to 35 g/10 min, like a range from 25.0 to 33.0 g/10 min.

Preferably, the plastomer (PL) comprises units derived from ethylene and a C4 to C20 α-olefin.

The plastomer (PL) comprises, preferably consists of, units derivable from (i) ethylene and (ii) at least another C4 to C20 α-olefin, like C4 to C10 α-olefin, more preferably units derivable from (i) ethylene and (ii) at least another α-olefin selected form the group consisting of 1-butene, 1-pentene, 1-hexene, 1-heptene and 1-octene. It is especially preferred that the plastomer (PL) comprises at least units derivable from (i) ethylene and (ii) 1-butene or 1-octene. It is especially preferred that the plastomer (PL) is a copolymer of ethylene and 1-octene.

In an especially preferred embodiment, the plastomer (PL) consists of units derivable from ethylene and 1-octene.

The comonomer content, like the C4 to C20 α-olefin content, of the plastomer (PL) is in the range of 5.0 to 30.0 mol-%, more preferably in the range of 10.0 to 25.0 mol %, still more preferably in the range of 12.0 to 23.0 mol-%, like in the range of 14.0 to 21.0 mol-%.

Preferably, the plastomer (PL) has an intrinsic viscosity (IV) determined according to DIN ISO 1628/1 (in Decalin at 135° C.) below 2.5 dl/g, more preferably in the range of 0.5 to 2.0 dl/g, still more preferably in the range of 0.6 to 1.5 dl/g, like in the range of 0.7 to 1.2 dl/g.

In one preferred embodiment the plastomer (PL) is prepared with at least one metallocene catalyst. The plastomer (PL) may also be prepared with more than one metallocene catalyst or may be a blend of multiple elastomers prepared with different metallocene catalysts. In some embodiments, the plastomer (PL) is a substantially linear ethylene polymer (SLEP). SLEPs and other metallocene catalysed plastomers (PL) are known in the art, for example, U.S. Pat. No. 5,272,236. These resins are also commercially available, for example, as Queo™ plastomers available from *Borealis*, ENGAGE™ plastomer resins available from Dow Chemical Co. or EXACT™ polymers from Exxon or TAFMER™ polymers from Mitsui.

The inventive polypropylene composition (C) is obtained by melt blending the heterophasic propylene copolymer (RAHECO) with the plastomer (PL).

The Additives

The polypropylene composition (C) of the present invention may include additives (AD). Typical additives are acid scavengers, antioxidants, colorants, light stabilisers, plasticizers, slip agents, anti-scratch agents, dispersing agents, processing aids, lubricants, pigments, fillers, and the like.

Such additives are commercially available and for example described in "Plastic Additives Handbook", 6th edition 2009 of Hans Zweifel (pages 1141 to 1190).

Furthermore, the term "additives (AD)" according to the present invention also includes carrier materials, in particular polymeric carrier materials.

The Polymeric Carrier Material

Preferably the polypropylene composition (C) of the invention does not comprise (a) further polymer (s) different to the heterophasic propylene copolymer (RAHECO) and the plastomer (PL), in an amount exceeding 15 wt.-%, preferably in an amount exceeding 10 wt.-%, more preferably in an amount exceeding 9 wt.-%, based on the weight of the polypropylene composition (C). If an additional polymer is present, such a polymer is typically a polymeric carrier material for the additives (AD). Any carrier material for additives (AD) is not calculated to the amount of polymeric compounds as indicated in the present invention, but to the amount of the respective additive.

The polymeric carrier material of the additives (AD) is a carrier polymer to ensure a uniform distribution in the composition (C) of the invention. The polymeric carrier material is not limited to a particular polymer. The polymeric carrier material may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The present invention is not only directed to the inventive polypropylene composition (C), but also to unoriented films made therefrom. Accordingly, in a further embodiment the present invention is directed to unoriented films, like cast films or blown films, e.g. air cooled blown films, comprising at least 70.0 wt.-%, preferably comprising at least 80.0 wt.-%, more preferably comprising at least 90.0 wt.-%, still more preferably comprising at least 95.0 wt.-%, yet more preferably comprising at least 99.0 wt.-%, of the inventive polypropylene composition (C). Preferably, the unoriented film consists of the inventive polypropylene composition (C).

One distinguishes between unoriented and oriented films (see for instance polypropylene handbook, Nello Pasquini, 2$^{nd}$ edition, Hanser). Oriented films are typically monoaxially or biaxially oriented films, whereas unoriented films are cast or blown films. Accordingly, an unoriented film is not drawn intensively in machine and/or transverse direction as done by oriented films. Thus the unoriented film according to this invention is not a monoaxially or biaxially oriented film. Preferably the unoriented film according to the instant invention is a blown film or cast film.

In one specific embodiment the unoriented film is a cast film or an air-cooled blown film.

Preferably the unoriented film has a thickness of 10 to 1000 μm, more preferably of 20 to 700 μm, like of 40 to 500 μm.

In the following the present invention is further illustrated by means of examples.

EXAMPLES

1. Measuring Methods

The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2) \quad \text{(I)}$$

wherein w(PP1) is the weight fraction [in wt.-%] of the first propylene copolymer fraction (R-PP1), w(PP2) is the weight fraction [in wt.-%] of second propylene copolymer fraction (R-PP2), C(PP1) is the comonomer content [in mol-%] of the first propylene copolymer fraction (R-PP1), C(PP) is the comonomer content [in mol-%] of the random propylene copolymer (R-PP), C(PP2) is the calculated comonomer content [in mol-%] of the second propylene copolymer fraction (R-PP2).

Calculation of the xylene cold soluble (XCS) content of the second propylene copolymer fraction (R-PP2):

$$\frac{XS(PP) - w(PP1) \times XS(PP1)}{w(PP2)} = XS(PP2) \quad \text{(II)}$$

wherein w(PP1) is the weight fraction [in wt.-%] of the first propylene copolymer fraction (R-PP1), w(PP2) is the weight fraction [in wt.-%] of second propylene copolymer fraction (R-PP2), XS(PP1) is the xylene cold soluble (XCS) content [in wt.-%] of the first propylene copolymer fraction (R-PP1), XS(PP) is the xylene cold soluble (XCS) content [in wt.-%] of the random propylene copolymer (R-PP), XS(PP2) is the calculated xylene cold soluble (XCS) content [in wt.-%] of the second propylene copolymer fraction (R-PP2), respectively.

Calculation of melt flow rate $MFR_2$ (230° C./2.16 kg) of the second propylene copolymer fraction (R-PP2):

$$MFR(PP2) = 10 \left[ \frac{\log(MFR(PP)) - w(PP1) \times \log(MFR(PP1))}{w(PP2)} \right] \quad \text{(III)}$$

wherein w(PP1) is the weight fraction [in wt.-%] of the first propylene copolymer fraction (R-PP1), w(PP2) is the weight fraction [in wt.-%] of second propylene copolymer fraction (R-PP2), MFR(PP1) is the melt flow rate $MFR_2$ (230° C./2.16 kg) [in g/10 min] of the first propylene copolymer fraction (R-PP1), MFR(PP) is the melt flow rate $MFR_2$ (230° C./2.16 kg) [in g/10 min] of the random propylene copolymer (R-PP), MFR(PP2) is the calculated melt flow rate $MFR_2$ (230° C./2.16 kg) [in g/10 min] of the second propylene copolymer fraction (R-PP2).

Calculation of comonomer content of the elastomeric propylene copolymer (E), respectively:

$$\frac{C(RAHECO) - w(PP) \times C(PP)}{w(E)} = C(E) \quad \text{(IV)}$$

wherein w(PP) is the weight fraction [in wt.-%] of the random propylene copolymer (R-PP), i.e. polymer produced in the first and second reactor (R1+R2), w(E) is the weight fraction [in wt.-%] of the elastomeric propylene copolymer (E), i.e. polymer produced in the third reactor (R3), C(PP) is the comonomer content [in mol-%] of the random propylene copolymer (R-PP), i.e. comonomer content [in mol-%] of the polymer produced in the first and second reactor (R1+R2), C(RAHECO) is the comonomer content [in mol-%] of the propylene copolymer, i.e. is the comonomer content [in mol-%] of the polymer obtained after polymerization in the third reactor (R3), C(E) is the calculated comonomer content [in mol-%] of elastomeric propylene copolymer (E), i.e. of the polymer produced in the third reactor (R3).

$MFR_2$ (230° C./2.16 kg) is measured according to ISO 1133 at 230° C. and 2.16 kg load.

$MFR_2$ (190° C./2.16 kg) is measured according to ISO 1133 at 190° C. and 2.16 kg load.

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 285 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17(1984), 1950).

With characteristic signals corresponding to 2.1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 331157) the correction for the influence of the regio defects on determined properties was required. Characteristic signals corresponding to other types of regio defects were not observed.

The comonomer fraction was quantified using the method of Wang et. al. (Wang, W.-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$E=0.5(I_H+I_G+0.5(I_C+I_D))$ using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E \text{ [mol \%]}=100*fE$$

The weight percent comonomer incorporation was calculated from the mole fraction:

$$E[\text{wt \%}]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Intrinsic viscosity is measured according to DIN ISO 1628/1, October 1999 (in Decalin at 135° C.).

The xylene solubles (XCS, wt.-%): Content of xylene cold solubles (XCS) is determined at 25° C. according ISO 16152; first edition; 2005 Jul. 1. The part which remains insoluble is the xylene cold insoluble (XCI) fraction.

Density is measured according to ISO 1183-187. Sample preparation is done by compression moulding in accordance with ISO 1872-2:2007.

Melting temperature ($T_m$) and crystallization temperature ($T_c$): measured with Mettler TA820 differential scanning calorimetry (DSC) on 5 to 10 mg samples. DSC is run according to ISO 11357-3:1999 in a heat/cool/heat cycle with a scan rate of 10° C./min in the temperature range of +23 to +210° C. Crystallization temperature ($T_c$) is determined from the cooling step, while melting temperature ($T_m$) is determined from the second heating step. The glass transition temperature Tg and the storage modulus G'(23° C.) are determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Hot Tack Force:

The hot tack force is determined on a J&B Hot Tack Tester with a film of 50 μm thickness with the following further parameters:

| | |
|---|---|
| Specimen width: | 25.4 mm |
| Seal Pressure: | 0.3 N/mm$^2$ |
| Seal Time: | 0.5 sec |
| Cool time: | 99 sec |
| Peel Speed: | 200 mm/sec |
| Start temperature: | 90° C. |
| End temperature: | 140° C. |
| Increments: | 10° C. |

The maximum hot tack force, i.e the maximum of a force/temperature diagram is determined and reported.

Hot tack initiation temperature: is determined from the hot tack curve at the point where the force exceeds 1 N.

Transparency, haze and clarity were determined according to ASTM D1003-00 on 60×60×1 mm$^3$ plaques injection molded in line with EN ISO 1873-2 using a melt temperature of 200° C. and on cast films of 50 μm thickness produced on a monolayer cast film line with a melt temperature of 220° C. and a chill roll temperature of 20° C.

Flexural Modulus: The flexural modulus was determined in 3-point-bending according to ISO 178 on 80×10×4 mm$^3$ test bars injection molded at 23° C. in line with EN ISO 1873-2.

2. Examples

Preparation of the Catalyst

The catalyst used in the polymerization processes for the heterophasic propylene copolymers (RAHECO) of the inventive examples (IE) was prepared as follows:

Used Chemicals:

20% solution in toluene of butyl ethyl magnesium (Mg(Bu)(Et), BEM), provided by Chemtura 2-ethylhexanol, provided by Amphochem 3-Butoxy-2-propanol—(DOWANOL™ PnB), provided by Dow bis(2-ethylhexyl)citraconate, provided by SynphaBase TiCl$_4$, provided by Millenium Chemicals Toluene, provided by Aspokem Viscoplex® 1-254, provided by Evonik Heptane, provided by Chevron Preparation of a Mg Alkoxy Compound Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl$_4$ and 1.1 kg of toluene were added into a 20l stainless steel reactor. Under 350 rpm mixing and keeping the temperature at 0° C., 14.5 kg of the Mg alkoxy compound prepared in example 1 was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethyl-aluminium (TEAL) as co-catalyst and dicyclopentyl dimethoxy silane (D-Donor) as donor.

TABLE 1

Preparation of RAHECO

| | | RAHECO |
|---|---|---|
| Prepolymerization | | |
| TEAL/Ti | [mol/mol] | 210 |
| TEAL/donor | [mol/mol] | 6.95 |
| Temperature | [° C.] | 20 |
| res.time | [h] | 0.38 |
| Loop | | |
| Temperature | [° C.] | 70 |
| Pressure | [kPa] | 5000 |
| Split | [%] | 35 |
| H2/C3 ratio | [mol/kmol] | 1.7 |
| C2/C3 ratio | [mol/kmol] | 4.5 |
| MFR$_2$ | [g/10 min] | 8.0 |
| XCS | [wt.-%] | 6.5 |
| C2 content | [mol-%] | 3.7 |
| GPR 1 | | |
| Temperature | [° C.] | 80 |
| Pressure | [kPa] | 2800 |
| Split | [%] | 52 |
| H2/C3 ratio | [mol/kmol] | 21.5 |
| C2/C3 ratio | [mol/kmol] | 28.1 |
| MFR$_2$ | [g/10 min] | 8.0 |
| XCS | [wt.-%] | 7.5 |
| C2 content | [mol-%] | 5.9 |
| GPR 2 | | |
| Temperature | [° C.] | 75 |
| Pressure | [kPa] | 2600 |
| Split | [%] | 13 |
| C2/C3 ratio | [mol/kmol] | 490 |
| H2/C2 ratio | [mol/kmol] | 530 |
| MFR$_2$ | [g/10 min] | 7.0 |
| XCS | [wt.-%] | 20.0 |
| IV (XCS) | [dl/g] | 1.5 |
| C2 (XCS) | [mol-%] | 40.3 |
| C2 content | [mol-%] | 11.5 |

C2 ethylene
H2/C3 ratio hydrogen/propylene ratio
C2/C3 ratio ethylene/propylene ratio
H2/C2 ratio hydrogen/ethylene ratio
GPR 1/2 1$^{st}$/2$^{nd}$ gas phase reactor
Loop Loop reactor
MFR$_2$ MFR(230° C./2.16 kg)

The RAHAECO1 and RAHECO2 were mixed in a twin-screw extruder with 0.2 wt.-% of Irganox B225 (1:1-blend of Irganox 1010 (Pentaerythrityl-tetrakis(3-(3',5'-di-tert-.butyl-4-hydroxytoluyl)-propionate and tris (2,4-di-t-butylphenyl) phosphate) phosphite) of BASF AG, Germany) and 0.1 wt.-% calcium stearate.

Preparation of the Composition (C)

Example IE1 (Inventive)

95 wt.-% of RAHECO1 and 5 wt.-% of the ethylene-octene copolymer Queo 8230 by Borealis were melt blended on a co-rotating twin screw extruder. The polymer melt mixture was discharged and pelletized.

Example IE2 (Inventive)

83 wt.-% of RAHECO1 and 17 wt.-% of the ethylene-octene copolymer Queo 8230 by Borealis were melt blended on a co-rotating twin screw extruder. The polymer melt mixture was discharged and pelletized.

TABLE 2

Properties of comparative and inventive examples

|  |  | CE1 | IE1 | IE2 |
|---|---|---|---|---|
| RAHECO | [wt.-%] | 100 | 95 | 83 |
| PL | [wt.-%] | 0 | 5 | 17 |
| MFR$_2$ | [g/10 min] | 7.0 | 7.8 | 10.0 |
| XCS | [wt.-%] | 20.0 | 22.0 | 32.3 |
| IV (XCS) | [dl/g] | 1.5 | 1.3 | 1.2 |
| C3 content | [mol-%] | 88.5 | 84.1 | 73.5 |
| C2 (XCS) | [mol-%] | 40.3 | 42.4 | 47.6 |
| Tm | [° C.] | 140 | 140 | 140 |
| Tc | [° C.] | 102 | 101 | 100 |
| G'(23° C.) | [MPa] | 417 | 342 | 275 |
| Tg(1) of (M) | [° C.] | −4.0 | — | — |
| Tg(2) of (E) | [° C.] | −54.0 | — | — |
| Tg(1)' | [° C.] | — | −5.3 | −4.8 |
| Tg(2)' | [° C.] | — | −50.0 | −50.0 |
| Flex. Modulus | [MPa] | 550 | 500 | 450 |
| Haze (film) | [%] | 3.0 | 1.2 | 1.3 |
| Hot tack force | [° C.] | 2.24 | 3.29 | 2.70 |
| Hot tack temperature | [° C.] | 112 | 107 | 98 |

MFR$_2$ MFR(230° C./2.16 kg)

PL is the commercial ethylene-octene copolymer Queo 8230 by Borealis having a density of 0.882 g/cm$^3$, a melt flow rate MFR$_2$ (190° C./2.16 kg) of 30 g/10 min and an 1-octene content of 17.0 mol-%.

The invention claimed is:

1. A polypropylene composition (C), comprising
   i) a heterophasic propylene copolymer (RAHECO), said heterophasic propylene copolymer comprising a matrix (M) being a random propylene copolymer (R-PP) and an elastomeric propylene copolymer (E) dispersed in said matrix (M),
   and
   ii) a plastomer (PL) being a copolymer of ethylene and at least one C4 to C20 α-olefin having a density below 0.900 g/cm$^3$,
   wherein the random propylene copolymer (R-PP) comprises a first propylene copolymer fraction (R-PP1) and a second propylene copolymer fraction (R-PP2) and the comonomer contents of the random propylene copolymer (R-PP) and the first propylene copolymer fraction (R-PP1) fulfil inequation (IIIb), $$\frac{Co(RPP)}{Co(RPP1)} \geq 1.4, \quad \text{(IIIb)}$$

wherein Co(RPP) is the comonomer content of the random propylene copolymer (R-PP) and Co(RPP1) is the comonomer content of the first propylene copolymer fraction (R-PP1), and wherein the first propylene copolymer fraction (R-PP1) is lean in comonomer compared to the second propylene copolymer fraction (R-PP2).

2. The polypropylene composition (C) according to claim 1, wherein the polypropylene composition (C) has at least two glass transition temperatures Tg(1) and Tg(2), the first glass transition temperature Tg(1) relates to the matrix (M) while the second glass transition temperature Tg(2) relates to the dispersed elastomeric propylene copolymer (E), wherein further the second glass transition temperature fulfils the inequation (II), $$Tg(2) > 9.0 - 2.0 \times C(XCS) \quad \text{(II)}$$

wherein
Tg(2) is the second glass transition temperature of the polypropylene composition (C) and C(XCS) is the comonomer content [in mol-%] of the xylene cold soluble fraction (XCS) of the polypropylene composition (C).

3. The polypropylene composition (C) according to claim 1, having at least two glass transition temperatures Tg(1)' and Tg(2)', wherein the second glass transition temperature fulfils the inequation (I), $$Tg(2)' > 10.0 - 1.8 \times C(XCS)' \quad \text{(I)}$$

wherein
Tg(2)' is the second glass transition temperature of the polypropylene composition (C) and C(XCS)' is the propylene content [in mol-%] of the xylene cold soluble fraction (XCS) of the polypropylene composition (C).

4. The polypropylene composition (C) according to claim 1, wherein the melt flow rate MFR$_2$ (230° C./2.16 kg) measured according to ISO 1133 of the polypropylene composition (C) is in the range of 1.0 to 30 g/10 min.

5. The polypropylene composition (C) according to claim 1, wherein the polypropylene composition (C) has at least one of:
   i) a xylene soluble content (XCS) in the range of 10.0 to 45.0 wt.-%, or
   ii) a propylene content in the range of 65.0 to 96.0 mol-%.

6. The polypropylene composition (C) according to claim 1, wherein the polypropylene composition (C) has a melting temperature of at least 135° C.

7. The polypropylene composition (C) according to claim 1, wherein the polypropylene composition (C) has at least one of:
   i) a flexural modulus measured according to ISO 178 below 600 MPa or
   ii) a haze according to ASTM D 1300-00 measured on a 50 μm thick cast film below 3.0%.

8. The polypropylene composition (C) according to claim 1, wherein the polypropylene composition (C) has
   an intrinsic viscosity (IV) determined according to DIN ISO 1628/1 (in Decalin at 135° C.) of the xylene soluble content (XCS) in the range of 0.7 to 2.0 dl/g.

9. The polypropylene composition (C) according to claim 1, comprising 60 to 99 wt.-% of the heterophasic propylene copolymer (RAHECO) and 1 to 40 wt.-% of the plastomer (PL).

10. The polypropylene composition (C) according to claim 1, wherein the comonomers of at least one of: the random propylene copolymer (R-PP) or the elastomeric propylene copolymer (E) are at least one of: ethylene or C$_4$ to C$_8$ α-olefins.

11. The polypropylene composition (C) according to claim 1, wherein the heterophasic propylene copolymer (RAHECO) has at least one of:
   a) a melt flow rate MFR$_2$ (230° C.) measured according to ISO 1133 in the range of 2.0 to 25.0 g/10 min, or
   b) a xylene soluble content (XCS) in the range of 10.0 to 40.0 wt.-%, or
   c) a comonomer content in the range of 1.5 to 20.0 mol-%.

12. The polypropylene composition (C) according to claim 1, wherein the comonomer of the plastomer (PL) is 1-octene.

13. The polypropylene composition (C) according to claim 1, wherein the plastomer (PL) has a melt flow rate MFR (190° C./2.16 kg) measured according to ISO 1133 below 50 g/10 min.

14. A film, comprising a polypropylene composition (C), the polypropylene composition comprising
  i) a heterophasic propylene copolymer (RAHECO), said heterophasic propylene copolymer comprising a matrix (M) being a random propylene copolymer (R-PP) and an elastomeric propylene copolymer (E) dispersed in said matrix (M), and
  ii) a plastomer (PL) being a copolymer of ethylene and at least one $C_4$ to $C_{20}$ α-olefin having a density below 0.900 g/cm$^3$,
    wherein the random propylene copolymer (R-PP) comprises a first propylene copolymer fraction (R-PP1) and a second propylene copolymer fraction (R-PP2) and the comonomer contents of the random propylene copolymer (R-PP) and the first propylene copolymer fraction (R-PP1) fulfil inequation (IIIb), $$\frac{Co(RPP)}{Co(RPP1)} \geq 1.4, \quad \text{(IIIb)}$$

wherein Co(RPP) is the comonomer content of the random propylene copolymer (R-PP) and Co(RPP1) is the comonomer content of the first propylene copolymer fraction (R-PP1), and wherein the first propylene copolymer fraction (R-PP1) is lean in comonomer compared to the second propylene copolymer fraction (R-PP2).

15. A polymerization process for producing the polypropylene composition (C) according to claim 1, comprising the steps of
  a) providing a plastomer (PL) being a copolymer of ethylene and at least one $C_4$ to $C_{20}$ α-olefin,
  b) polymerizing in a first reactor (R1) propylene and at least one of: ethylene or a $C_4$ to $C_8$ α-olefin, obtaining a first random propylene copolymer fraction (R-PP1),
  c) transferring the first random propylene copolymer fraction (R-PP1) into a second reactor (R2),
  d) polymerizing in said second reactor (R2) in the presence of the first random propylene copolymer fraction (R-PP1) propylene and at least one of: ethylene or a $C_4$ to $C_8$ α-olefin, obtaining a second random copolymer fraction (R-PP2), said first random propylene copolymer fraction (R-PP1) and said second random copolymer fraction (R-PP2) forming the random propylene copolymer (R-PP),
  e) transferring said random propylene copolymer (R-PP) into a third reactor (R3),
  f) polymerizing in said third reactor (R3) in the presence of at least one of: the random propylene copolymer (R-PP) propylene or a $C_4$ to $C_8$ α-olefin, obtaining a third polymer fraction, said polymer fraction is the elastomeric copolymer (E), said propylene copolymer (R-PP) and said elastomeric propylene copolymer (E) form the heterophasic propylene copolymer (RAHECO),
  g) melt blending the heterophasic propylene copolymer (RAHECO) obtained in step f) with the plastomer (PL) of step a).

16. The polypropylene composition (C) according to claim 11, wherein the heterophasic propylene copolymer (RAHECO) has a xylene soluble content (XCS) in the range of 10.0 to 40.0 wt.-%, having a comonomer content below 50 mol-%.

* * * * *